United States Patent [19]
Kedski

[11] Patent Number: 5,579,907
[45] Date of Patent: Dec. 3, 1996

[54] DEVICE AND METHOD FOR INDEXING COMPACT DISCS

[76] Inventor: Robert Kedski, 177A Plain St., Millis, Mass. 02054

[21] Appl. No.: 274,649

[22] Filed: Jul. 13, 1994

[51] Int. Cl.$^6$ .................................................. B65D 85/57
[52] U.S. Cl. ...................... 206/307.1; 206/308.1
[58] Field of Search ................... 283/36, 37, 38, 283/39; 206/425, 308.3, 309, 307.1, 308.1, 459.5; 24/67.3, 67.9, 67 CF

[56] References Cited

U.S. PATENT DOCUMENTS

| | | | |
|---|---|---|---|
| 2,014,267 | 9/1935 | Sherman | 24/67.5 |
| 2,938,252 | 5/1960 | Scheemaeker | 24/67.9 |
| 3,286,381 | 11/1966 | Wooge | 24/67.5 |
| 4,012,087 | 3/1977 | Edwards, Jr. | 206/425 X |
| 4,332,060 | 6/1982 | Sato | 24/67.9 |
| 4,532,680 | 8/1985 | Hashimoto | 24/67.9 X |
| 4,676,372 | 6/1987 | Rager | 206/308.3 X |
| 4,850,477 | 7/1989 | Gelardi et al. | 206/425 X |
| 5,413,215 | 5/1995 | Hardinger, Jr. | 206/308.3 X |

OTHER PUBLICATIONS

Gopher Products Corp., Divider Cards & Etc., Customer Guide 192, pp. 1–12.
MacTec, Discpickables™ Personal CD Dividers, Product No. CD–001/Vertical.

*Primary Examiner*—Jacob K. Ackun
*Attorney, Agent, or Firm*—Wolf, Greenfield & Sacks, P.C.

[57] ABSTRACT

A method and apparatus is provided for organizing a compact disc collection. In one embodiment of the invention, the device includes a body constructed and arranged to attach to an edge of a compact disc box, and an identifier attached to the body. The body is a generally U-shaped clip that grips the rear edge of the compact disc box. The identifier is an alphabetical letter or some other symbol and can be positioned on the clip for vertical or horizontal stacking of the collection. The collection is arranged into particular groups of compact discs. An index clip is then attached to at least one compact disc within each group and has an identifier for the group.

2 Claims, 2 Drawing Sheets

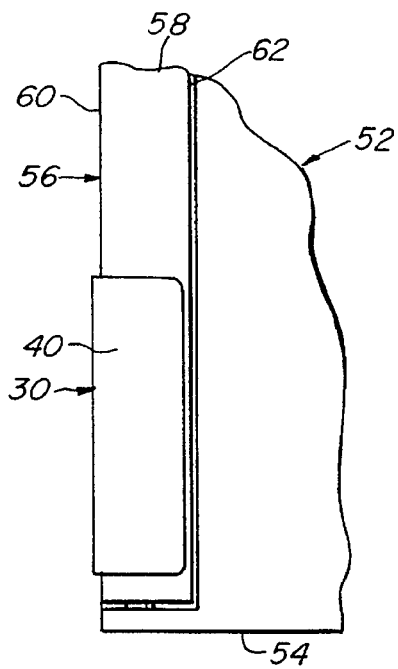
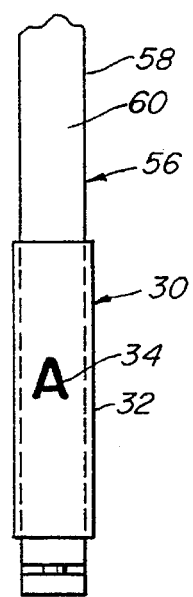
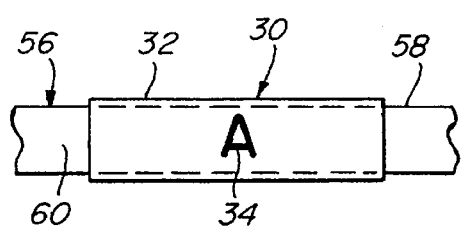
Fig. 7    Fig. 8    Fig. 9
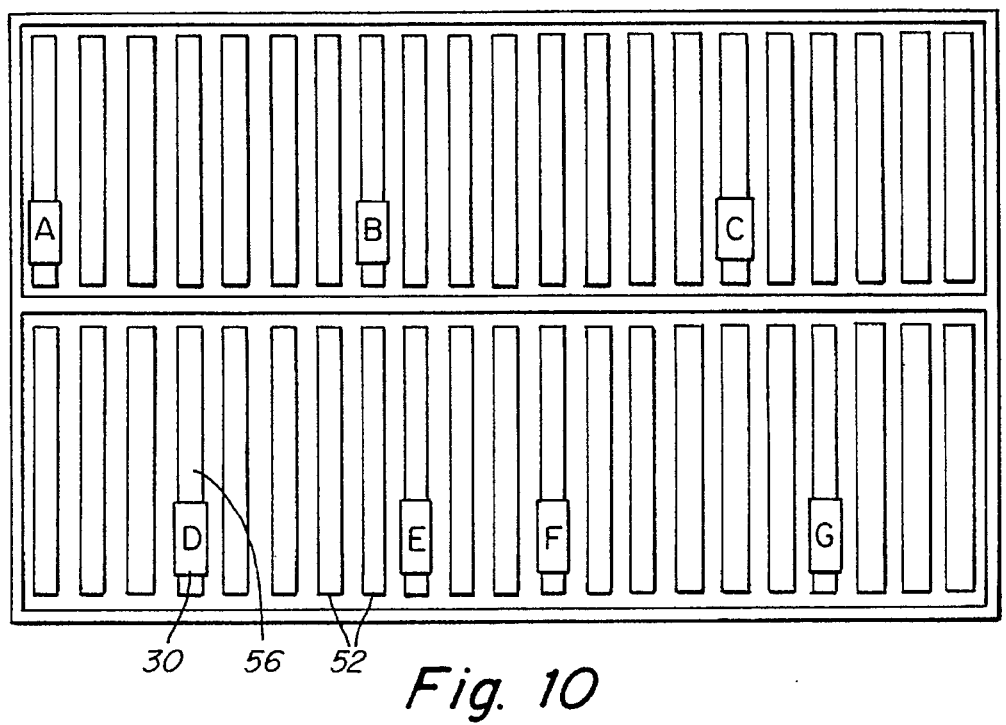
Fig. 10

DEVICE AND METHOD FOR INDEXING COMPACT DISCS

FIELD OF THE INVENTION

The present invention relates generally to a method and apparatus for organizing a compact disc collection. More particularly, the present invention is directed to a device that includes an identification label and attaches to the edge of a compact disc box, as well as to a method for using the device to organize a compact disc collection.

BACKGROUND OF THE INVENTION

Compact discs (CDs) have become the medium of choice in the music industry, and for the most part have displaced the use of vinyl albums for prerecorded music. CD owners typically store their CDs together in a collection. Devices have been developed to assist in storing a CD collection, many having a plurality of slots that each accepts and holds an individual compact disc box. An owner of a CD collection may choose to organize the collection alphabetically, or in some other manner such as by music type, to facilitate easy location of a desired CD. However, as the size of the CD collection increases, systematic organization of the collection alone may not be sufficient to allow one to easily locate a specific selection.

Devices have been developed to assist in organizing a collection to facilitate selection of a desired CD. FIG. 1 illustrates an example of such a device. The device includes a plurality of dividers 20 that are used to subdivide a collection of compact discs into alphabetical groupings. Each divider 20 is a thin card having a body 22 and a tab 24. The body 22 is approximately the size of a standard CD box so that when the CD collection is stored in a storage unit having a plurality of slots, each divider may be inserted into a slot along with a corresponding CD box. The tab 24 designates a particular alphabetical grouping of CDs and extends beyond the end of the CD or its associated storage unit. However, the alphabetical designation is printed on only one side of the tab, making it difficult to identify a particular grouping unless the CD collection is viewed from that side. Although the tab 24 may be bent along a fold line 26 so that it can be read from the front, the tab 24 is easily displaced and may become difficult to read unless viewed from an awkward angle. Additionally, the thin divider 20 is susceptible to becoming damaged through normal wear and tear associated with its use.

It is an object of the present invention to provide an improved system for indexing a compact disc collection.

SUMMARY OF THE INVENTION

The foregoing disadvantages are overcome in one illustrative embodiment of the invention in which a device is provided for organizing a compact disc collection. The device includes a body that is constructed and arranged to attach to an edge of a compact disc box, and an identifier that is located on the body.

In another illustrative embodiment of the invention, a plurality of compact disc boxes is provided in combination with a plurality of clips. Each of the clips is attached to the edge of a compact disc box, and has an identifying label attached thereto.

In a further illustrative embodiment of the invention, a method is provided for organizing a compact disc collection. The method includes arranging the collection into particular groups of compact discs, providing a set of index clips, and attaching an index clip to at least one compact disc within each corresponding group.

Numerous other objects, features and advantages of the invention should become apparent upon a reading of the following detailed description taken in conjunction with the accompanying drawings.

BRIEF DESCRIPTION OF THE DRAWINGS

FIG. 7 is a partial side elevational view of an index clip of the present invention attached to a typical compact disc box;

FIG. 8 is a partial front view of the index clip of FIGS. 2–6 attached to a compact disc box in a vertical stacking configuration;

FIG. 9 is a partial front view of an alternate embodiment of the index clip of the present invention, configured for horizontal stacking, attached to a compact disc box; and FIG. 10 is a front view of a compact disc collection organized in a vertical stacking configuration shown with index clips attached to identify particular groups of compact discs.

DETAILED DESCRIPTION

Figure 1:
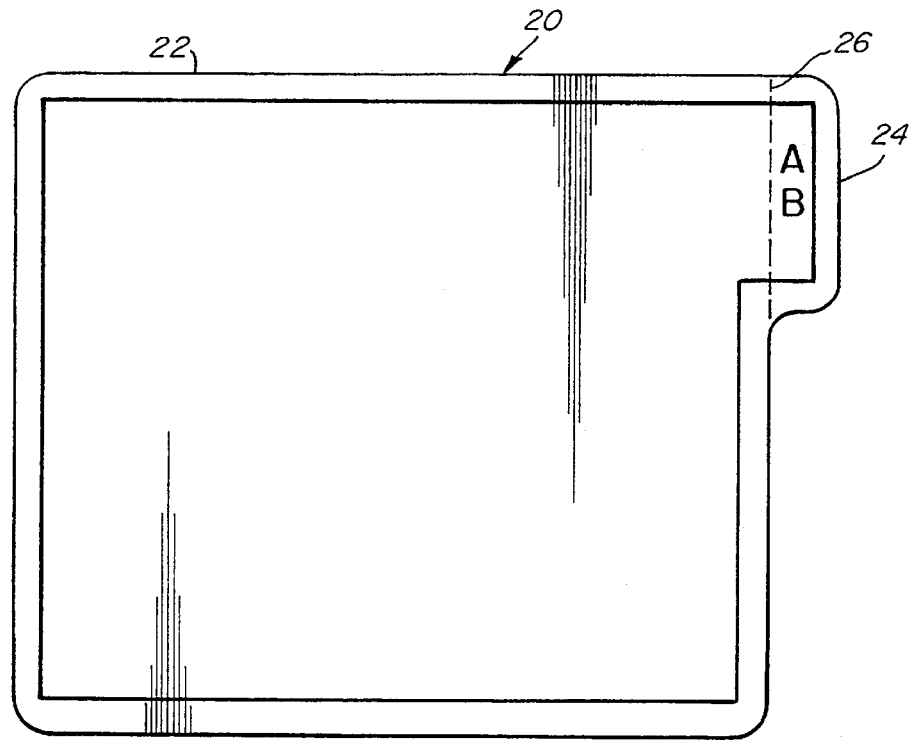
FIG. 1 is a side view of a prior art compact disc divider.
Figure 2:
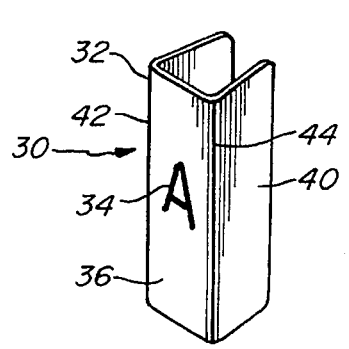
FIG. 2 is a perspective view of an index clip according to the present invention for use in a vertical stacking CD collection.
Figure 3:
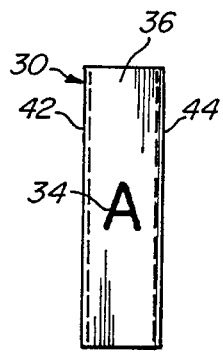
FIG. 3 is front view of the index clip of FIG. 2.
Figure 4:
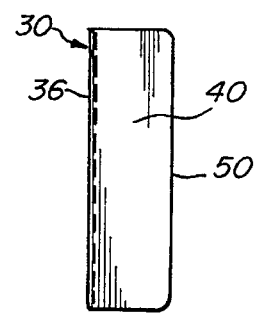
FIG. 4 is a side view of the index clip of FIGS. 2–3.
Figure 5:
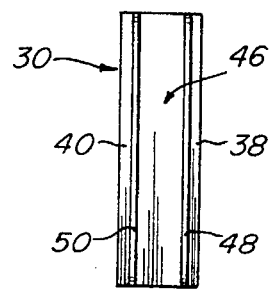
FIG. 5 is a rear view of the index clip of FIGS. 2–4.

The present invention is directed to an index clip, an illustrative embodiment of which is shown in FIGS. 2–6. The clip 30 is used to index a collection of compact discs, and includes a body 32 having a front face 36 and sidewalls 38 and 40. An identifier 34 is attached to the front face. The front face 36 is of a rectangular shape and has a width that is slightly larger than the depth of a CD box. It should be understood that CD boxes are available in various depths, for example, single and double CD boxes. Thus, the clip of the present invention can be provided in different sizes to correspond to CD boxes of different depths.

Figure 6:
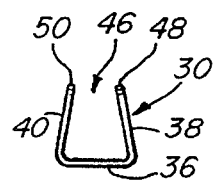
FIG. 6 is a bottom view of the index clip of FIGS. 2–5.

The index clip sidewalls 38 and 40 protrude from edges 42 and 44 of the front face 36, and extend away from the front face 36 to form a generally U-shaped channel 46, best shown in FIG. 6. The sidewalls 38 and 40 are generally rectangular, with rear edges 48 and 50 that are respectively disposed opposite the front edges 42 and 44. The sidewalls 38 and 40 are angled to converge toward each other as they extend from the front face 36 to the rear edges 48 and 50. Thus, the width of the channel 46 progressively decreases from the front face 36 to the rear edges 48 and 50, where it is narrower than the depth of a typical CD box. When the clip is attached to the edge of a CD box, the rear edges 48 and 50 are separated to allow the clip to fit about the box edge. The tendency of the sidewalls 38 and 40 is to return to their unstressed configuration, so the sidewalls create a springing effect which provides a gripping force to retain the index clip 30 on the compact disc box 52.

Referring to FIG. 7, a clip 30 according to the present invention is shown attached to a CD box 52. The CD box 52 has a cover 54 which pivots about a hinge 56 as the cover 54 is opened and closed. The hinge 56 has a rear edge 58 and a front surface 60 that extends from and is generally perpendicular to the rear edge 58. The width of the rear edge 58 defines the depth of the CD box 52. The front surface 60 of the hinge is generally coplanar with the closed cover 54, and has a forward edge 62 adjacent the closed cover 54 that defines the width of the front surface 60. The clip 30 is preferably attached about the rear edge 58 of the hinge 56 and one of its sidewalls engages the front surface 60. It is preferred to maximize the width of the sidewalls 38 and 40 to enhance the ability of the clip to remain attached to the CD box 52, but without interfering with opening and closing of the CD cover 54. Thus, the width of the sidewalls 38 and 40 is preferably matched to the width of the front surface 60 of the CD box 52.

In one embodiment of the invention for use with a typical single CD box, the front face 36 has a width of approximately 0.40 inches. The sidewalls 38 and 40 are angled approximately eighty degrees from the front face 36, and have a width of approximately 0.44 inches. This results in a channel width at the rear edges 48 and 50 of approximately 0.25 inches.

In one embodiment of the invention, the clip 32 is formed from a plastic material, such as, for example, acrylonitrile butadiene styrene. Additionally, other plastic materials can also be used for forming the body 32, such as, for example, polypropylene or polyvinyl chloride (PVC). Further, other suitable materials can also be used, including elastomers or metals such as steel, copper alloys or nickel alloys. The body 32 can be formed by injecting heated material into a mold, and cooling the material so that it solidifies. It should be understood that other methods of forming the body 32 can also be utilized, such as bending a flat blank of clip material into the desired configuration.

The identifier 34 can be a word, a letter of the alphabet, a number, a symbol, or any other identifier for meaningfully indexing a collection of CDs. In one embodiment, the identifier 34 is a decal, and the clips are provided in a set of twenty-six, each having an identifier corresponding to a letter of the alphabet from A to Z. The decal 34 can also be provided in a more regular shape, such as for example a rectangle, with the identifier extending over only a portion of the decal.

In one embodiment, the identifier decal is made from a vinyl material having a high contrasting color as compared to the clip body 32, and is furnished in a neon or florescent color to further increase the contrast. The decal 34 can be backed with a pressure sensitive adhesive to facilitate its attachment to the clip body 32. The decal 34 is relatively large in relation to the front face 36 of the body 32 to facilitate easy identification of the index clips 30 when they are attached to the CD boxes 52. In one embodiment, the height of the decal 34 is approximately 0.31 inches.

Although the identifier 34 in the illustrative embodiment described above is a decal, it should be understood that other types of identifiers can also be utilized. For example, the identifier can be attached to the clip body by stenciling, silkscreening, hot stamping or by integrally molding the identifier with the clip body 32.

As shown in FIGS. 8 and 9, the index clips 30 can be provided in either a vertical or horizontal configuration to accommodate both vertical and horizontal CD stacking, both of which are employed by conventional CD storage units. The index clips 30 can be supplied without the identifiers 34 and clip bodies 32 being attached to provide the user with the flexibility of configuring the clips 30 in either the vertical or horizontal configuration. Alternatively, different sets of index clips can be provided with preattached identifiers in both the horizontal and vertical configurations. In the vertical configuration shown in FIG. 8, the identifier 34 extends along the length of the clip body 32 so that when attached to the CD box, the identifier also extends along the rear edge 58. Conversely, in the horizontal configuration shown in FIG. 9, the identifier 34 extends across the width of the clip body 32 so that when attached to the CD box, it also extends across the rear edge 58.

The clip of the present invention can be used to organize a collection of CDs in the following manner, making reference to FIG. 10. A set of index clips 30 is provided, with a different identifier 34 associated with each clip 30. For example, twenty-six index clips can be provided, each having an identifier that corresponds to a different letter of the alphabet from A to Z. The collection is arranged either vertically or horizontally, and a set of index clips is provided in the corresponding vertical (FIG. 8) or horizontal (FIG. 9) stacking configuration. The collection of CDs is arranged into particular groups selected in any desired manner, either alphabetically by the name of the artist or the album, or in some other meaningful way. A group of index clips is then selected wherein each clip 30 has an identifier that meaningfully identifies one of the particular CD groups. For example, if the CDs are arranged alphabetically by artist, identifiers can be selected for each letter of the alphabet that has at least one corresponding CD in the collection.

Each of the selected index clips 30 is then attached to the rear edge 58 of at least one CD within its corresponding grouping. For example, when the collection is alphabetically arranged, an index clip 30 having a particular letter identification may be attached to the first CD of each alphabetical grouping, such as, the left-most CD box in a vertical stacking configuration and the top CD box in a horizontal stacking configuration.

The index clips of the present invention can be easily attached or removed from a CD box. Thus, as the size of the CD collection increases or decreases over time, the index clips 30 may be removed from or attached to CD boxes 52 to re-index the collection. Further, if it is desired to reorganize the collection in a different manner, the clips of the present invention can be easily removed and reattached. Additionally, the identifiers 34 can be removed from the clip bodies 32 and replaced with new identifiers is so desired.

Having described illustrative embodiments of the invention in detail, those skilled in the art will appreciate that numerous modifications may be made to this embodiment without departing from the spirit of the invention. Therefore, it is not intended that the breadth of this invention be limited to the specific embodiments illustrated and described. Rather, the breadth of the invention is to be determined by the appended claims and their equivalents.

What is claimed is:

1. An apparatus comprising, in combination:
    a compact disc box having an edge with a width that defines a depth of the compact disc box; and
    an index clip comprising a body attached to the edge of the compact disc box and an identifier attached to the body; wherein:
        the compact disc box includes a hinge and a cover capable of being opened and closed about the hinge, the hinge having a length extending along the edge of the compact disc box, the hinge further having a width extending substantially normally from the edge; and the body includes a front face that defines a length and a width of the body, and two sidewalls connected to and extending from the front face, each sidewall having a rear edge disposed opposite the front face, the sidewalls being angled toward each other to form a channel having a width that progressively decreases from approximately the depth of the compact disc box adjacent the front face to less than the depth of the compact disc box adjacent the rear edges of the sidewalls, the sidewalls having a width that is not greater than the width of the hinge so that the sidewalls do not interfere with opening and closing the cover.

2. An apparatus comprising, in combination:

a plurality of compact disc boxes, each compact disc box having an edge with a width that defines a depth of the compact disc box; and a plurality of clips, each clip being attached to the edge of a compact disc box, each clip including a body and an identifier attached to the body; wherein:

each compact disc box includes a hinge and a cover capable of being opened and closed about the hinge, the hinge having a length extending along the edge of the compact disc box, the hinge further having a width extending substantially normally from the edge; and the body of each clip includes a front face that defines a length and a width of the body, and two sidewalls connected to and extending from the front face, each sidewall having a rear edge disposed opposite the front face, the sidewalls being angled toward each other to form a channel having a width that progressively decreases from approximately the depth of the compact disc box adjacent the front face to less than the depth of the compact disc box adjacent the rear edges of the sidewalls, the sidewalls having a width that is not greater than the width of the hinge so that the sidewalls do not interfere with opening and closing the cover.

* * * * *